US012198500B2

(12) United States Patent
Dhaliwal

(10) Patent No.: US 12,198,500 B2
(45) **Date of Patent: *Jan. 14, 2025**

(54) SYSTEM AND METHOD FOR PROVIDING DURATIONAL PROMOTIONS TO PLAYERS

(71) Applicant: Kabam, Inc., San Francisco, CA (US)

(72) Inventor: Harmanpal Dhaliwal, Alameda, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,582

(22) Filed: Jun. 15, 2023

(65) Prior Publication Data

US 2024/0021050 A1 Jan. 18, 2024

Related U.S. Application Data

(63) Continuation of application No. 17/580,401, filed on Jan. 20, 2022, now Pat. No. 11,694,515, which is a continuation of application No. 16/833,236, filed on Mar. 27, 2020, now Pat. No. 11,238,698, which is a continuation of application No. 15/695,962, filed on Sep. 5, 2017, now Pat. No. 10,636,248, which is a continuation of application No. 14/162,630, filed on Jan. 23, 2014, now Pat. No. 9,754,448.

(51) Int. Cl.
*G07F 17/32* (2006.01)

(52) U.S. Cl.
CPC ...... *G07F 17/3244* (2013.01); *G07F 17/3255* (2013.01); *G07F 17/323* (2013.01); *G07F 17/3269* (2013.01)

(58) Field of Classification Search
None
See application file for complete search history.

(56) References Cited

U.S. PATENT DOCUMENTS

| | | | | |
|---|---|---|---|---|
| 10,636,248 | B1 | 4/2020 | Dhaliwal | |
| 11,238,698 | B2 | 2/2022 | Dhaliwal | |
| 11,694,515 | B2 * | 7/2023 | Dhaliwal | G07F 17/3244 463/20 |
| 2003/0119579 | A1 | 6/2003 | Walker | |
| 2003/0203751 | A1 | 10/2003 | Fox | |
| 2004/0102238 | A1 | 5/2004 | Taylor | |
| 2004/0162130 | A1 | 8/2004 | Walker | |
| 2006/0211465 | A1 | 9/2006 | Moshal | |
| 2007/0184891 | A1 | 8/2007 | Thomas | |

(Continued)

*Primary Examiner* — Damon J Pierce
(74) *Attorney, Agent, or Firm* — Esplin & Associates, PC

(57) ABSTRACT

One aspect of the disclosure relates to providing durational promotions to players in an online game. The system may adjust the outcome probabilities of winning in a slot machine type of game once the player's content drops below a predetermined threshold so that the player will experience some substantial winning in the initial period. The system may adjust the outcome probabilities of winning in the slot machine type of game for a period of time once a player has purchased content to continue to play the game. This may temporarily adjusting outcome probabilities within the game in favor of a player that has recently made a purchase. This may facilitate positive player experiences subsequent to making purchases, thereby increasing further purchases and/or the likelihood thereof.

14 Claims, 10 Drawing Sheets

(56) References Cited

U.S. PATENT DOCUMENTS

| | | | |
|---|---|---|---|
| 2008/0200251 | A1 | 8/2008 | Alderucci |
| 2010/0069134 | A1 | 3/2010 | Davis |
| 2010/0227675 | A1 | 9/2010 | Luxton |
| 2012/0071223 | A1 | 3/2012 | Sharkov |
| 2012/0208628 | A1 | 8/2012 | Oberberger |
| 2012/0258793 | A1 | 10/2012 | Lebaron |
| 2012/0289330 | A1 | 11/2012 | Leydon |
| 2013/0184060 | A1 | 7/2013 | Costello |
| 2014/0274308 | A1 | 9/2014 | Guinn |
| 2020/0349814 | A1 | 11/2020 | Dhaliwal |
| 2022/0157119 | A1 | 5/2022 | Dhaliwal |

* cited by examiner

SYSTEM AND METHOD FOR PROVIDING DURATIONAL PROMOTIONS TO PLAYERS

FIELD OF THE DISCLOSURE

This disclosure relates to providing durational promotions to players in an online game provided on the basis of an in-game purchase.

BACKGROUND

In traditional slot machine games, payouts to the players may be based on predetermined payout tables. Furthermore, players may be provided additional incentives based on maximum betting and/or in-game statues. However, these players typically stop spending after they get discouraged in the game by not winning.

SUMMARY

One aspect of the disclosure relates to providing durational promotions to players in an online game. The system may adjust the outcome probabilities of winning in a slot machine type of game once the player's content drops below a predetermined threshold so that the player will experience some substantial winning in the initial period. The system may adjust the outcome probabilities of winning in the slot machine type of game for a period of time once a player has purchased content to continue to play the game. This may temporarily adjusting outcome probabilities within the game in favor of a player that has recently made a purchase. This may facilitate positive player experiences subsequent to making purchases, thereby increasing further purchases and/or the likelihood thereof.

A system configured for providing durational promotions to players may include a server. The server may operate in a client/server architecture with one or more client computing platforms. The client computing platforms may be associated with the players of the online game. The server may be configured to execute one or more of a game module, a user module a purchase module, an outcome probability adjustment module, a network module, a reward module, and/or other modules.

The game module may be configured to execute a game instance of a game space. The game module may facilitate participation of the players in an online game that takes place in the game space by effectuating performance of operations in the instance of the game space in response to commands received from the players. The operations may comprise operations of a first operation type, wherein the outcome of operations of the first operation type are determined stochastically or quasi-stochastically based on one or more outcome probabilities for the first operation type, and wherein the players include a first player and/or any other player.

The user module may be configured to access and/or manage one or more player accounts associated with individual players of the system. The one or more player accounts may contain player parameters associated with the individual players. The set of parameters may include parameters reflecting the individual players progression in the online game, parameters indicating various statistics about content that have been amassed by the players in the online game, parameters indicating various statistics about the players' performance in competitions, parameters indicating various statistics about relationships achieved by the given player in and/or outside of the online game, and/or any other player parameters. The player accounts managed by the user module may include a first player account associated with a first player in the online game. The first player account may include a first set of player parameters associated with the first player and/or any other player within the online game.

The purchase module may be configured to facilitate purchases by players of content for use within the online game and/or any other game. In various embodiments, players within the game can acquire content in the form of virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. In some embodiments, a player may earn virtual currency by taking action in the game. For example, a player may be rewarded with one or more units of virtual currency after completing a task, quest, challenge, or mission within the game.

The outcome probability adjustment module may be configured to temporarily adjust the one or more outcome probabilities in favor of players that have purchased content. Responsive to a purchase of content by the first player, the one or more outcome probabilities for operations of the first operation type requested by the first player may be temporarily adjusted in favor of the first player and/or any other players.

The outcome probability adjustment module may be configured such that the temporary adjustment of the one or more outcome probabilities is for a predetermined period of time and/or a random period of time. The outcome probability adjustment module may be configured such that the adjustment of the one or more outcome probabilities for operations of the first operation type is communicated to the first player and/or any other players. The outcome probability adjustment module may be configured such that the time period during which the one or more outcome probabilities are temporarily adjusted is determined stochastically and/or quasi-stochastically.

The outcome probability adjustment module may be configured such that the adjustment of the one or more outcome probabilities for operations of the first operation type is communicated to the first player. The outcome probability adjustment module may be configured such that the temporary adjustment of the one or more outcome probabilities is triggered responsive to a determination that the purchases of content made by the first player breaches a threshold purchase amount and/or any other purchase amount.

The outcome probability adjustment module may be configured such that the temporary adjustment of the one or more outcome probabilities is extended based on an additional purchase by the first player of content for use within the game. The outcome probability adjustment module may be configured such that the extended period of time is displayed to the player. In some implementations, a clock may be displayed on the player interface depicting the temporary adjustment of the one or more outcome probabilities.

The reward module may be configured to determine rewards for the players participating in the online game based on the game play. In some examples, this may involve jackpot rewards, bonus game outcomes, free spins, and/or any other rewards. In some examples, the rewards determined by the reward module may be in accordance with one or more reward tables, conversion tables, and/or any other reward schemes predetermined by the provider, administrator, moderator, and/or any other entities related to the online game. In some examples, the reward module may be configured to facilitate notification of the reward schemes for a given game prior to the commencement of the given game. The rewards may include virtual currency, real-world currency, virtual items, play sessions, and/or any other consideration from the given player. For example, the reward for the given user may include a quantity of optional turns to play the game in exchange for certain amount of real-world currency from the given player. In some examples, the reward module may determine a point of time by which the given player must acquire the optional turns included in the reward. A notification about such a point of time may be communicated to the given player before that point of time.

In some examples, features of individual turns rewarded to the players may be determined by the reward module. In one example, such features may include the turns (i.e., the free and/or optional turns) rewarded to higher ranked players may have higher priorities for playing the secondary game than those rewarded to lower ranked players.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
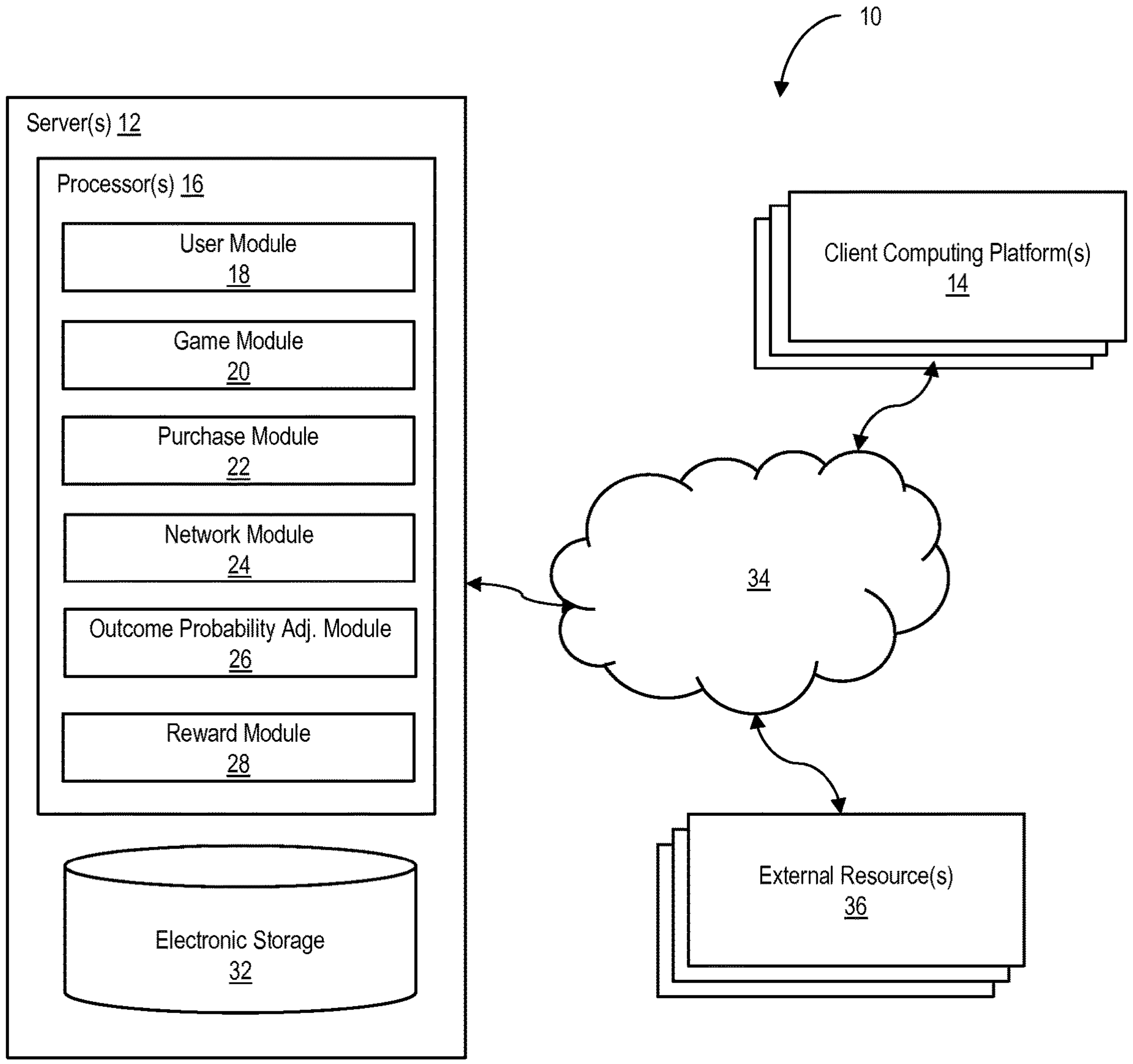
FIG. 1 illustrates an exemplary system configured to providing durational promotions to players in an online game, according to an aspect of the invention.

FIG. 1 illustrates a system 10 configured to providing durational promotions to players in an online game, according to an aspect of the invention. In some implementations, system 10 may include a game server(s) 12. The game server(s) 12 may host a game space in which an online game takes place. The game server(s) 12 may be configured to communicate with one or more client computing platform(s) 14 according to a client/server architecture. The players may access system 10 and/or the virtual space via client computing platform(s) 14.

The game server(s) 12 may be configured to execute one or more computer program modules. The computer program modules may include one or more of a user module 18, a game module 20, a purchase module 22, a network module 24, an outcome probability adjustment module 26, a reward module 28, and/or any other modules.

The system may comprise a user module 18 configured to store inventories of virtual items that are available to players in the game space. The inventories may include a first inventory and/or any other inventory of virtual items available to a first player in the game space.

The user module 18 may be configured to access and/or manage one or more player profiles and/or player information associated with players of the system 10. The one or more player profiles and/or player information may include information stored by game server(s) 12, one or more of the client computing platform(s) 14, and/or other storage locations. The player profiles may include, for example, information identifying players (e.g., a player name or handle, a number, an identifier, and/or other identifying information) within the virtual space, security login information (e.g., a login code or password), virtual space account information, subscription information, virtual currency account information (e.g., related to currency held in credit for a player), relationship information (e.g., information related to relationships between players in the virtual space), virtual space usage information, demographic information associated with players, interaction history among players in the virtual space, information stated by players, purchase information of players, browsing history of players, a client computing platform identification associated with a player, a phone number associated with a player, and/or other information related to players.

The user module 18 may be configured to store inventories of virtual items including resources that are available to players in the virtual space. Various matters may be collected in an inventory. These matters may include, but are not limited to, virtual items, virtual resources, character attributes, character skills, and/or virtual currency.

Players within the game may acquire virtual currency. In such games, the virtual currency might be represented by virtual coins, virtual cash, or by a number or value stored by the server for that player's benefit. Such virtual currency may represent units of value for use as consideration in transactions in the online game system, and/or may be analogous to legal currency. Virtual currency can be purchased for real money consideration. Such purchases may be made for cash or credit denominated in real money, made be made for another virtual currency previously purchased by a player for real money (e.g., Facebook credits, Bitcoins, and/or other virtual currency). A player may earn virtual currency by taking action in the game. For example, a player may be rewarded with one or more units of virtual currency after completing a task, quest, challenge, or mission within the game. For example, a slot machine game might reward 10 gold coins each time the player completes a bonus game.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may be awarded for leveling up in the game.

The game module 20 may be configured to execute a game instance of a game space. The game module 20 may facilitate participation of the players in an online game that takes place in the game space by effectuating performance of operations in the instance of the game space in response to commands received from the players. The operations may comprise operations of a first operation type, wherein the outcome of operations of the first operation type are determined stochastically or quasi-stochastically based on one or more outcome probabilities for the first operation type, and wherein the players include a first player and/or any other player. In some implementations, the game may include chance-based gameplay, such as random player selection, random automatic selection, dice, wheel spinning, roulette, spinning tops, card drawing, lottery, blackjack, slots, keno, poker, mini-game, battle outcomes, loot drop outcomes, and/or any other chance-based games.

In an outcome of the game, a given player may engage in the gameplay provided by the game to win one or more of the potential awards. For determining an outcome of the game, the game module 20 may be configured to stochastically or quasi-stochastically select one of the potential awards as an actual award for distribution to the given player as a result of the gameplay engaged in by the given player based on the award probabilities with the potential awards. In some examples, the gameplay provided by the secondary game may include chance-based gameplay, such as random player selection, random automatic selection, dice, wheel spinning, roulette, spinning tops, card drawing, lottery, and/or any other chance-based gameplays. In some implementations, an outcome may be a determination of a reward for performing some action within the online game. For example, upon completing a level, defeating a non-player character, defeating a player opponent, and/or other actions in the game, a reward outcome may be stochastically or quasi-stochastically determined. This may include selecting a reward from among a set of potential rewards. The individual potential awards may be associated with outcome probabilities. Stochastic or quasi-stochastic selection of one of the potential rewards as the reward in accordance with the outcome probabilities.

The game module 20 may be configured to implement the instance of the virtual space executed by the computer modules to determine state of the virtual space. The state may then be communicated (e.g., via streaming visual data, via object/position data, and/or other state information) from server(s) 12 to client computing platform(s) 14 for presentation to players. The state determined and transmitted to a given client computing platform(s) 14 may correspond to a view for a player character being controlled by a player via the given client computing platform(s) 14. The state determined and transmitted to a given client computing platform (s) 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the player.

The instance of the virtual space may comprise a simulated space that is accessible by players via clients (e.g., client computing platform(s) 14) that present the views of the virtual space to a player. The simulated space may have a topography, express ongoing real-time interaction by one or more players, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by game module 20 is not intended to be limiting. The game module 20 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game module 20, players may control characters, objects, simulated physical phenomena (e.g., wind, rain, earthquakes, and/or other phenomena), and/or other elements within the virtual space to interact with the virtual space and/or each other. The player characters may include avatars. As used herein, the term "player character" may refer to an object (or group of objects) present in the virtual space that represents an individual player. The player character may be controlled by the player with which it is associated. The player-controlled element(s) may move through and interact with the virtual space (e.g., non-player characters in the virtual space, other objects in the virtual space). The player-controlled elements controlled by and/or associated with a given player may be created and/or customized by the given player. The player may have an "inventory" of virtual goods and/or currency that the player can use (e.g., by manipulation of a player character or other player-controlled element, and/or other items) within the virtual space.

The players may participate in the instance of the virtual space by controlling one or more of the available player-controlled elements in the virtual space. Control may be exercised through control inputs and/or commands input by the players through client computing platform(s) 14. The players may interact with each other through communications exchanged within the virtual space. Such communications may include one or more of textual chat, instant messages, private messages, voice communications, and/or other communications. Communications may be received and entered by the players via their respective client computing platform(s) 14. Communications may be routed to and from the appropriate players through server(s) 12 (e.g., through game module 20).

The purchase module 22 may be configured to facilitate purchases by players of content for use within the online game and/or any other game. In some implementations, players within the game can acquire content in the form of virtual currency, virtual goods, virtual items, and/or other content. In such games, virtual currency might be represented by virtual coins, virtual cash, by a number or value stored by the server for that player's benefit, and/or through other representations. Such virtual currency represents units of value for use in the online game system, and is analogous to legal currency. The content may be purchased through exchange of consideration having real money value. Such consideration may include one or more of real money (e.g., through a credit/debit/charge card transaction, through an ACH transaction, and/or other real money transactions), a virtual currency purchased with real money (e.g., FaceBook® Credits, Microsoft™ Points, and/or other virtual currency), and/or other consideration having real money value.

In some implementations, players may purchase content in the form of item instances of virtual items. The virtual items may include a first virtual item and/or any other item. A virtual item may be an item that can be used in the game instance by the player. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, game tokens, gaming chips, and/or other items.

The potential awards may include premium items highly sought after in the online game, items that may be used to augment and/or enhance other items, such as items rewarded by the events within the online game, improvements to one or more player parameters, virtual services (e.g., enhanced graphics of the online game provided to the players), and/or any other awards that may be provided through the game. The individual potential awards for the game may be predetermined by the provider, administrator, moderator, and/or any other entities related to the online game at a configuration stage of the system. Simultaneously or alternatively, the individual potential awards may be determined dynamically during the instance of the online by the provider, administrator, moderator, and/or any other entities related to online game. In some examples, the potential awards of the game may be dynamically determined based on one or more items rewarded by events in the online game. In some implementations, players may be rewarded with one or more units of virtual currency after completing a task, quest, challenge, or mission within the game.

In some implementations, when determining an outcome of the award, the game may be configured to stochastically or quasi-stochastically select one of the potential awards as an actual award for distribution to the given player as a result of the gameplay engaged in by the given player based on the award probabilities with the individual ones of the potential awards. In some examples, the gameplay provided by the game may include chance-based gameplay, such as random player selection, random automatic selection, dice, wheel spinning, roulette, spinning tops, card drawing, lottery, and/or any other chance-based gameplays. By way of a non-limiting example, in one instance, the game may include a slots gameplay, after a player makes an in-game purchase, a player may spin the wheels to win potential awards provided by the game. In that instance, to simulate the wheel spins gameplay for the individual turn, the game may obtain a set of award probabilities associated with the individual potential rewards (e.g., 10% of chance the wheels stop at a top award, 20% the wheels stop at the second top award, and so on). With the obtained award probabilities and the potential awards, the game may simulate the wheel spins for the individual turn and select an actual award from the potential awards according to the stopping point of the wheels. In some exemplary implementations, the game may employ a dice function for effectuating such simulation such that the inputs of the dice function are the potential award set and the award probabilities and the output is an actual award.

The network module 24 of the game server(s) 12 may be configured to maintain a connection to the one or more client computing platform(s) 14. For example, the network module 24 may maintain one or more communication lines or ports to enable connection and/or exchange of information with a network 34 and/or other computing platform(s) 14. Information such as state information, game state and game logic may be communicated via network module. The network module 24 may be configured to receive information from the client computing platform(s) 14 as well.

The outcome probability adjustment module 26 may be configured to temporarily adjust the one or more outcome probabilities in favor of players that have purchased content. Responsive to a purchase of content by the first player, the one or more outcome probabilities for operations of the first operation type requested by the first player may be temporarily adjusted in favor of the first player and/or any other players.

In some implementations, for example, in a slot machine type of game, during a period of initial playing, outcome probabilities of winning may be adjusted for a player whenever the player's coin inventory drops below certain predetermined threshold. The duration of such period of initial play (i.e., an immunity period) may be determined by a provider or administrator of the game. In some implementations, the game may include chance-based gameplay, such as random player selection, random automatic selection, dice, wheel spinning, roulette, spinning tops, card drawing, lottery, blackjack, slots, keno, poker, mini-game, battle outcomes, and/or any other chance-based gameplays.

The outcome probability adjustment module 26 may be configured such that the temporary adjustment of the one or more outcome probabilities is for a predetermined period of time and/or a random period of time. The outcome probability adjustment module 26 may be configured such that the adjustment of the one or more outcome probabilities for operations of the first operation type is communicated to the first player and/or any other players. The outcome probability adjustment module 26 may be configured such that the time period during which the one or more outcome probabilities are temporarily adjusted is determined stochastically and/or quasi-stochastically.

In some implementations, for example, it may be determined that for the first minutes of the player playing the game, outcome probabilities of winning in the game may increase. For example, the outcome probabilities may increase 4× whenever the player coin inventory drops below, say 100 coins. In this way, the player may be guaranteed to experience some substantial winning for at least the first 10 minutes of his/her play so that the player may be motivated to continue to play after the first 10 minutes. In some implementations, multiple thresholds may be established for different outcome probabilities to increase. For example, if the player's coins drop below 200, increase the outcome probabilities 2×; if the player's coins drop below 100, increase outcome probabilities 4×; if the player's coins drop below 50, increase the outcome probabilities 8×.

In some implementations, the outcome probabilities may adjust the winning for a period of time whenever a player has purchased certain amount of coins for playing the game. For example, after the initial period of play, the player may purchase some more coins and/or virtual currency to play the game longer. Such purchase by the player may be monitored and detected. Upon the detection of the coin purchase by the player, winning outcome probabilities in the game may be increased. In some implementations, outcome probabilities may increase 3× for a period of time, for example, 5 minutes. As such, the player may likely experience some substantial winning in the immediate period after purchasing the coins so that the player may perceive the coin purchase as positive, and thus may be motivated to purchase coins again.

The outcome probability adjustment module 26 may be configured such that the adjustment of the one or more outcome probabilities for operations of the first operation type is communicated to the first player. The outcome probability adjustment module 26 may be configured such that the temporary adjustment of the one or more outcome probabilities is triggered responsive to a determination that the purchases of content made by the first player breaches a threshold purchase amount and/or any other purchase amount.

In some implementations, for example, a clock and/or any other time period display mechanism displaying the time the player remains in the promotion period may be shown to the player. In some implementations, the player is not aware of the promotion period.

The outcome probability adjustment module 26 may be configured such that the temporary adjustment of the one or more outcome probabilities is extended based on an additional purchase by the first player of content for use within the game. The outcome probability adjustment module 26 may be configured such that the extended period of time is displayed to the player. In some implementations, a clock may be displayed on the player interface depicting the temporary adjustment of the one or more outcome probabilities. In some implementations, the extended period of time is based on the amount of virtual content purchased. In some implementations, the extended period of time is based on the outcome a player achieves within a certain period of time after purchasing virtual content. For example, if the player continues to lose after receiving an outcome probability adjustment for a period of time, and additional extended period of time may be implemented for the adjusted outcome probabilities. In some implementations, the outcome probabilities may be adjusted again during the extended period of time.

The reward module 28 may be configured to determine rewards for the players participating in the online game based on the game play. In some examples, this may involve jackpot rewards, bonus game outcomes, free spins, and/or any other rewards. In some examples, the rewards determined by the reward module may be in accordance with one or more reward tables, conversion tables, and/or any other reward schemes predetermined by the provider, administrator, moderator, and/or any other entities related to the online game. In some examples, the reward module 28 may be configured to facilitate notification of the reward schemes for a given game prior to the commencement of the given game.

In some implementations, the rewards may include virtual currency, real-world currency, virtual items, play sessions, and/or any other consideration from the given player. For example, the reward for the given user may include a quantity of optional turns to play the game in exchange for certain amount of real-world currency from the given player. In some examples, the reward module 28 may determine a point of time by which the given player must acquire the optional turns included in the reward. A notification about such a point of time may be communicated to the given player before that point of time.

In some examples, features of individual turns may be rewarded to the players and may be determined by the reward module. In one example, such features may include the turns (i.e., the free and/or optional turns) rewarded to higher ranked players may have higher priorities for playing the secondary game than those rewarded to lower ranked players.

The game server(s) 12, client computing platform(s) 14, and/or external resource(s) 36 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server(s) 12, client computing platform(s) 14, and/or external resource(s) 36 may be operatively linked via some other communication media.

Game server(s) 12 may include electronic storage 32, one or more processors 16, and/or other components. Game server(s) 12 may include communication lines, or ports to enable the exchange of information with a network 34 and/or other computing platforms 14. Illustration of game server(s) 12 in FIG. 1 is not intended to be limiting. Game server(s) 12 may include a plurality of hardware, software, and/or firmware components operating together to provide the functionality attributed herein to game server(s) 12. For example, game server(s) 12 may be implemented by a cloud of computing platforms operating together as game server(s) 12.

Electronic storage 32 may comprise non-transitory storage media that electronically stores information. The electronic storage media of electronic storage 32 may include one or both of system storage that is provided integrally (i.e., substantially non-removable) with game server(s) 12 and/or removable storage that is removably connectable to game server(s) 12 via, for example, a port (e.g., a USB port, a firewire port, etc.) or a drive (e.g., a disk drive, etc.). Electronic storage 32 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 32 may include one or more virtual storage resources (e.g., cloud storage, a virtual private network, and/or other virtual storage resources). Electronic storage 32 may store software algorithms, information determined by processor(s) 16, information received from game server(s) 12, information received from client computing platform(s) 14, and/or other information that enables game server(s) 12 to function as described herein.

Processor(s) 16 is configured to provide information processing capabilities in game server(s) 12. As such, processor(s) 16 may include one or more of a digital processor, an analog processor, a digital circuit designed to process information, an analog circuit designed to process information, a state machine, and/or other mechanisms for electronically processing information. Although processor(s) 16 is shown in FIG. 1 as a single entity, this is for illustrative purposes only. In some implementations, processor(s) 16 may include a plurality of processing units. These processing units may be physically located within the same device, or processor(s) 16 may represent processing functionality of a plurality of devices operating in coordination. The processor(s) 16 may be configured to execute modules 18, 20, 22, 24, 26, and/or 28. Processor(s) 16 may be configured to execute modules 18, 20, 22, 24, 26, and/or 28 by software; hardware; firmware; some combination of software, hardware, and/or firmware; and/or other mechanisms for configuring processing capabilities on processor(s) 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 24, 26, and/or 28 are illustrated in FIG. 1 as being implemented within a single processing unit, in implementations in which processor includes multiple processing units, one or more of modules 18, 20, 22, 24, 26, and/or 28 may be implemented remotely from the other modules. The description of the functionality provided by the different modules 18, 20, 22, 24, 26, and/or 28 described below is for illustrative purposes, and is not intended to be limiting, as any of modules 18, 20, 22, 24, 26, and/or 28 may provide more or less functionality than is described. For example, one or more of modules 18, 20, 22, 24, 26, and/or 28 may be eliminated, and some or all of its functionality may be provided by other ones of modules 18, 20, 22, 24, 26, and/or 28. As another example, processor(s) 16 may be configured to execute one or more additional modules that may perform some or all of the functionality attributed below to one of modules 18, 20, 22, 24, 26, and/or 28.

A given client computing platform(s) 14 may include one or more processors configured to execute computer program modules. The computer program modules may be configured to enable an expert or player associated with the given client computing platform(s) 14 to interface with system 10, game server(s) 12, and/or external resource(s) 36, and/or provide other functionality attributed herein to client computing platform(s) 14. By way of non-limiting example, the given client computing platform(s) 14 may include one or more of a desktop computer, a laptop computer, a handheld computer, a tablet computing platform, a NetBook, a Smartphone, a gaming console, and/or other computing platforms.

External resource(s) 36 may include sources of information, hosts and/or providers of virtual spaces outside of system 10, external entities participating with system 10, and/or other resources. In some implementations, some or all of the functionality attributed herein to external resource (s) 36 may be provided by resources included in system 10.

Figure 2:
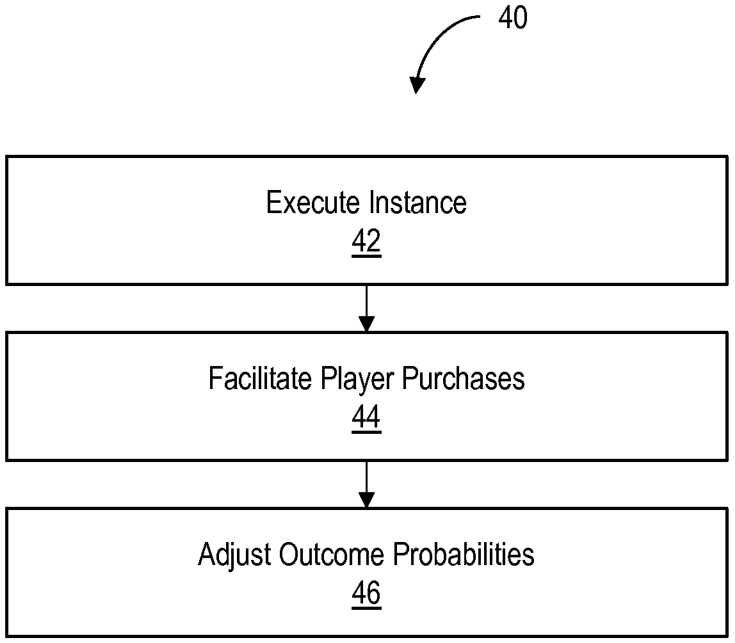
FIG. 2 illustrates an exemplary method of providing durational promotions to players in an online game, according to various aspects of the invention.

FIG. 2 illustrates a method 40 configured to facilitate providing durational promotions to players in an online game, according to an aspect of the invention. The operations of method 40 presented below are intended to be illustrative. In some embodiments, method 40 may be accomplished with one or more additional operations not described, and/or without one or more of the operations discussed. The order in which the operations of method 40 are illustrated in FIG. 2 and described below is not intended to be limiting.

In some embodiments, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 40.

At an operation 42, an instance of a virtual space may be executed. In some implementations, operation 42 may be performed by a game module the same as or similar to game module 20 (shown in FIG. 1 and described above).

At an operation 44, the executed instance of the virtual space may facilitate player purchases. The individual episode may include one or more players. In some implementations, operation 44 may be performed by a purchase module the same as or similar to purchase module 22 (shown in FIG. 1 and described above).

At an operation 46, outcome probabilities may be adjusted. In some implementations, operation 46 may be performed by an outcome probability adjustment module the same as or similar to outcome probability adjustment module 26 (shown in FIG. 1 and described above).

Figure 10:
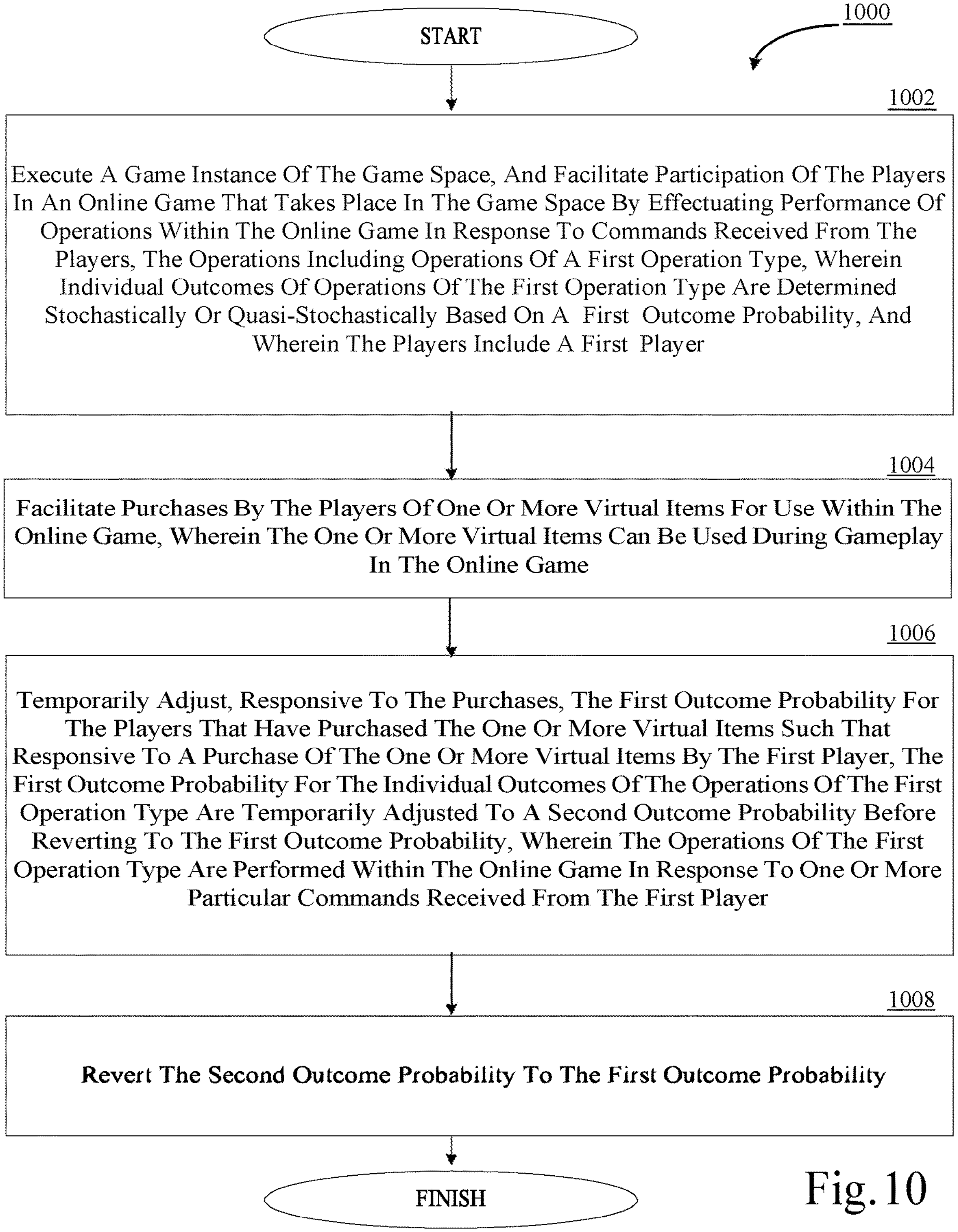
FIG. 10 illustrates an exemplary method of providing durational promotions to players in an online game, according to various aspects of the invention.

FIG. 10 illustrates a method 1000 configured to facilitate providing durational promotions to players in an online game, according to an aspect of the invention. The operations of method 1000 presented below are intended to be illustrative. In some embodiments, method 1000 may be accomplished with one or more additional operations not described, and/or without one or more of the operations discussed. The order in which the operations of method 1000 are illustrated in FIG. 10 and described below is not intended to be limiting.

In some embodiments, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

At an operation 1002, a game instance of a game space may be executed, and participation of the players in an online game that takes place in the game space may be facilitated by effectuating performance of operations within the online game in response to commands received from the players. The operations may include operations of a first operation type. Individual outcomes of operations of the first operation type may be determined stochastically or quasi-stochastically based on a first outcome probability. The players may include a first player. In some implementations, operation 1002 may be performed by a game module the same as or similar to game module (shown in FIG. 1 and described above).

At an operation 1004, purchases by the players may be facilitated of one or more virtual items for use within the online game. The one or more virtual items can be used during gameplay in the online game. In some implementations, operation 1004 may be performed by a purchase module the same as or similar to purchase module 22 (shown in FIG. 1 and described above).

At an operation 1006, the first outcome probability may be temporarily adjusted, responsive to the purchases, for the players that have purchased the one or more virtual items such that responsive to a purchase of the one or more virtual items by the first player, the first outcome probability for the individual outcomes of the operations of the first operation type are temporarily adjusted to a second outcome probability before reverting to the first outcome probability. The operations of the first operation type may be performed within the online game in response to one or more particular commands received from the first player. In some implementations, operation 1006 may be performed by an outcome probability adjustment module the same as or similar to outcome probability adjustment module 26 (shown in FIG. 1 and described above).

At an operation 1008, the second outcome probability may be reverted to the first outcome probability, In some implementations, operation 1008 may be performed by an outcome probability adjustment module the same as or similar to outcome probability adjustment module 26 (shown in FIG. 1 and described above).

Figure 3:
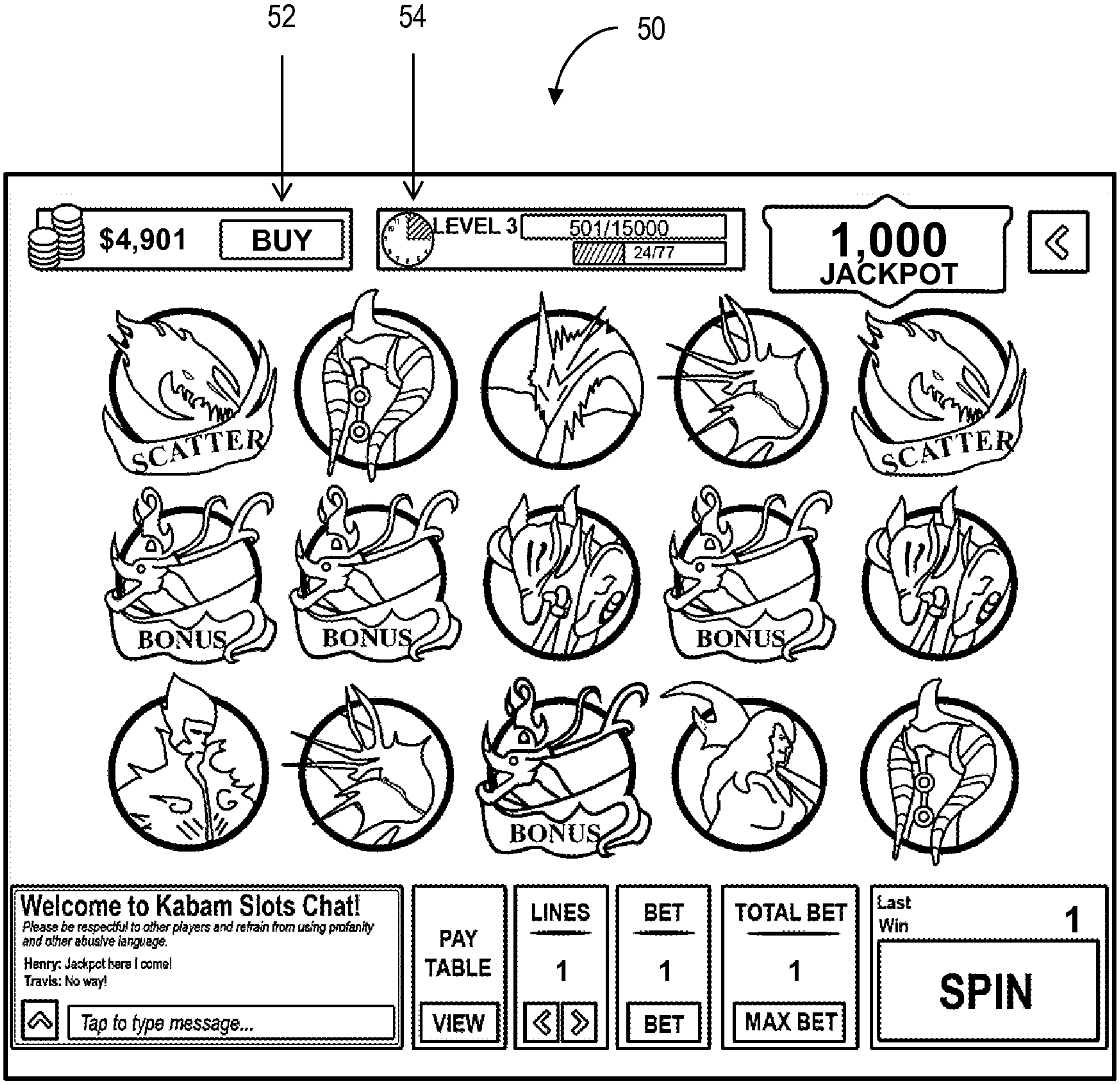
FIG. 3 illustrates an exemplary diagram of a user interface which provides durational promotions to players in an online game, according to an aspect of the invention.

FIG. 3 illustrates an exemplary diagram of a player interface 50 which provides durational promotions to players in an online game, according to an aspect of the invention. As shown, player interface 50 enables a player to purchase virtual content 52. In some implementations, the player interface may display the period of time 54 the outcome probability has been adjusted.

Figure 4:
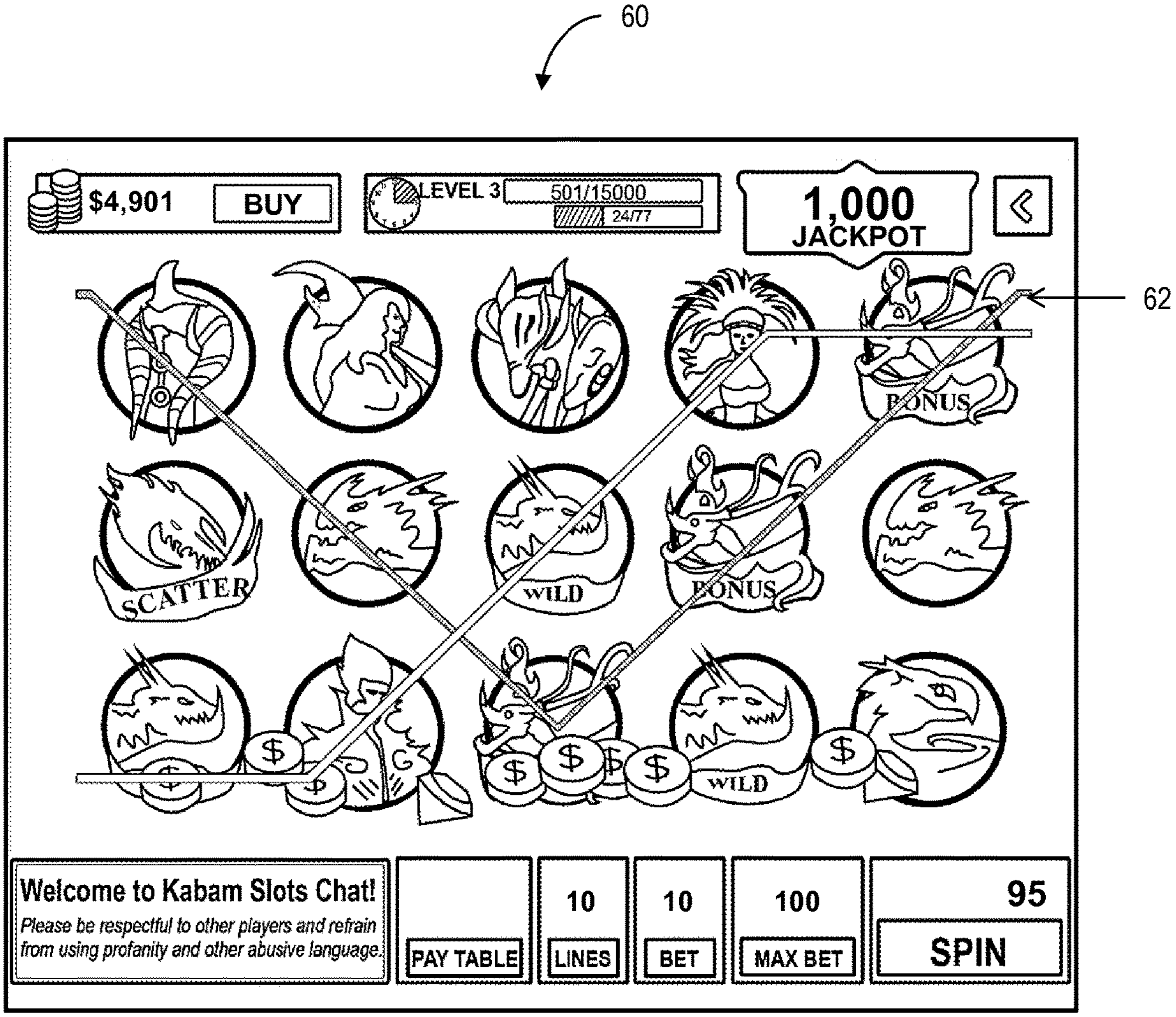
FIG. 4 illustrates an exemplary diagram of a user interface which provides durational promotions to players in an online game, according to an aspect of the invention.

FIG. 4 illustrates an exemplary diagram of a player interface 60 which provides durational promotions to players in an online game, according to an aspect of the invention. A player may receive a notification 62 during the game that the player has won. Game notifications may be in various forms including taking the form of banners, scrolling text or tickers, flashing objects, pop-up windows, frames or borders, and/or any other type of notification during and/or after the execution of the game.

Figure 5:
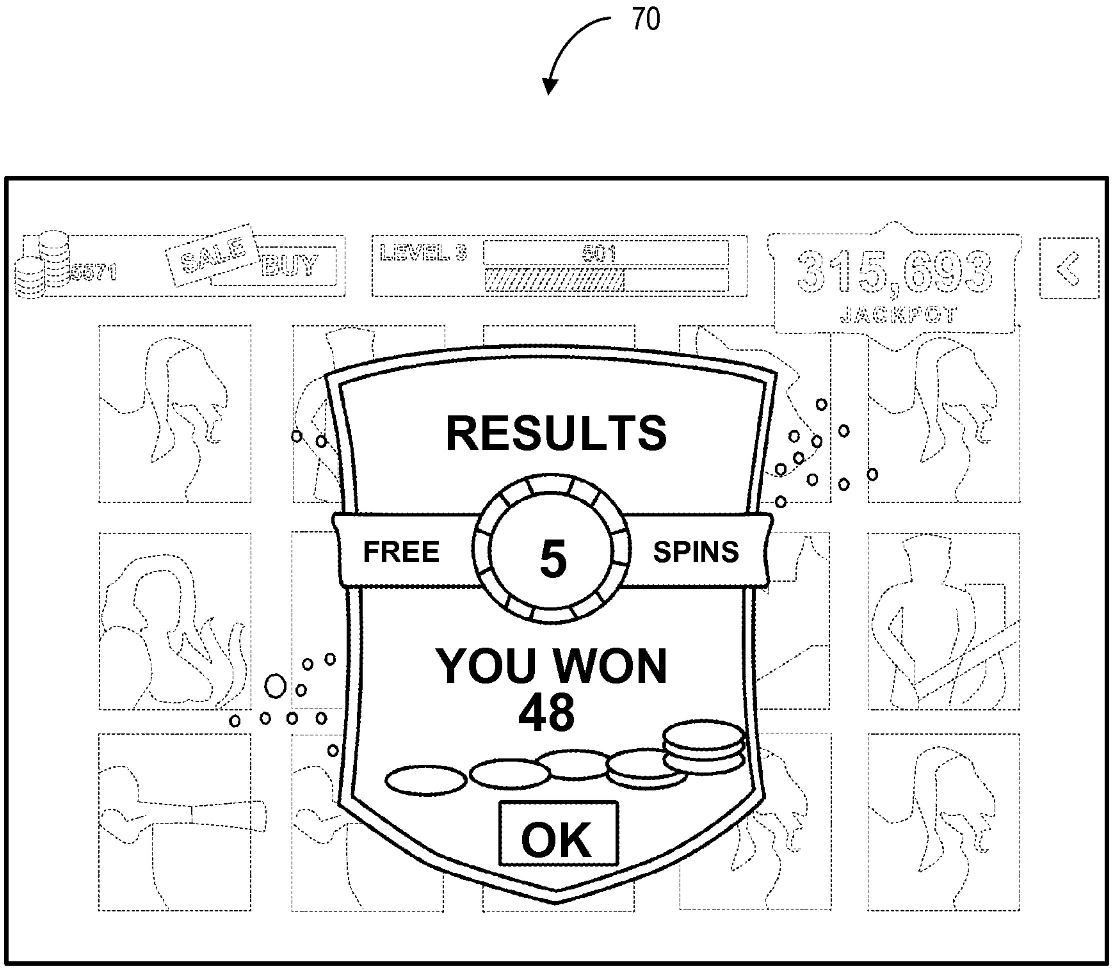
FIG. 5 illustrates an exemplary diagram of a user interface which provides durational promotions to players in an online game, according to an aspect of the invention.

FIG. 5 illustrates an exemplary diagram of a player interface 70 which provides durational promotions to players in an online game, according to an aspect of the invention. As shown, player interface 70 enables a player to view a notification that the player has won.

Figure 6:
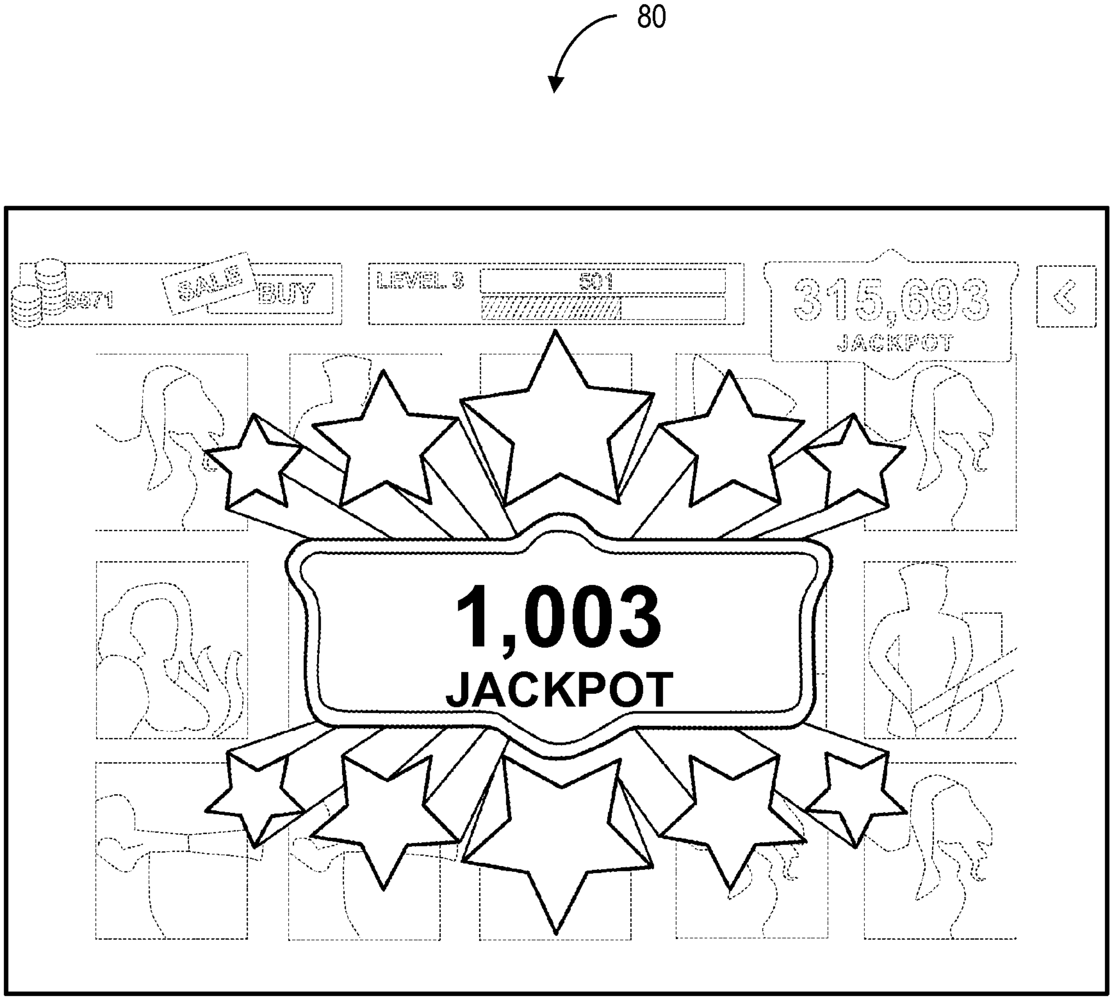
FIG. 6 illustrates an exemplary diagram of a user interface which provides durational promotions to players in an online game, according to an aspect of the invention.

FIG. 6 illustrates an exemplary diagram of a player interface 80 which provides durational promotions to players in an online game, according to an aspect of the invention. As shown, player interface 80 enables a player to view a notification that the player has won.

Figure 7:
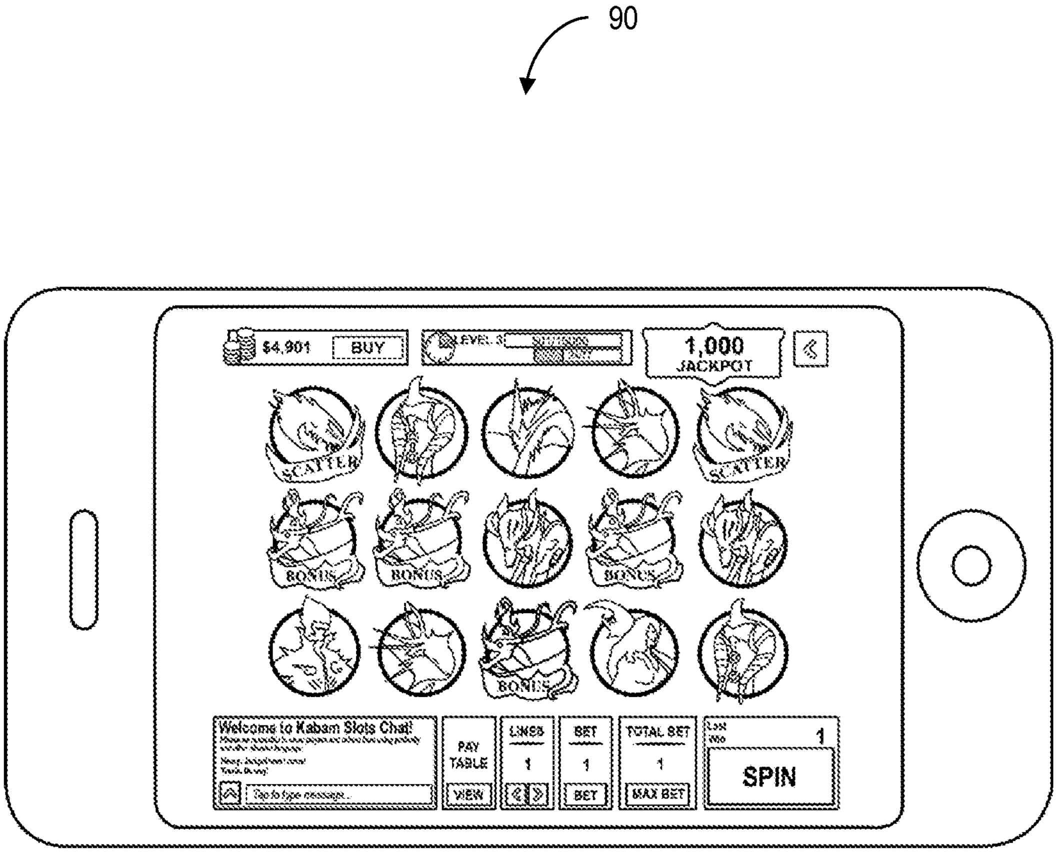
FIG. 7 illustrates an exemplary diagram of a user interface which provides durational promotions to players in an online game, according to an aspect of the invention.

FIG. 7 illustrates an exemplary diagram of a player interface 90 which provides durational promotions to players in an online game, according to an aspect of the invention. There may be several platforms in which the game may be implemented. Some platforms may include hardware platforms, operating system platforms and/or software platforms. In some implementations, hardware platform may include different types of systems in general (e.g., mainframe, workstation, desktop, handheld and/or embedded) and/or the specific type of processor (e.g., x86, SPARC, PowerPC and/or Alpha).

Figure 8:
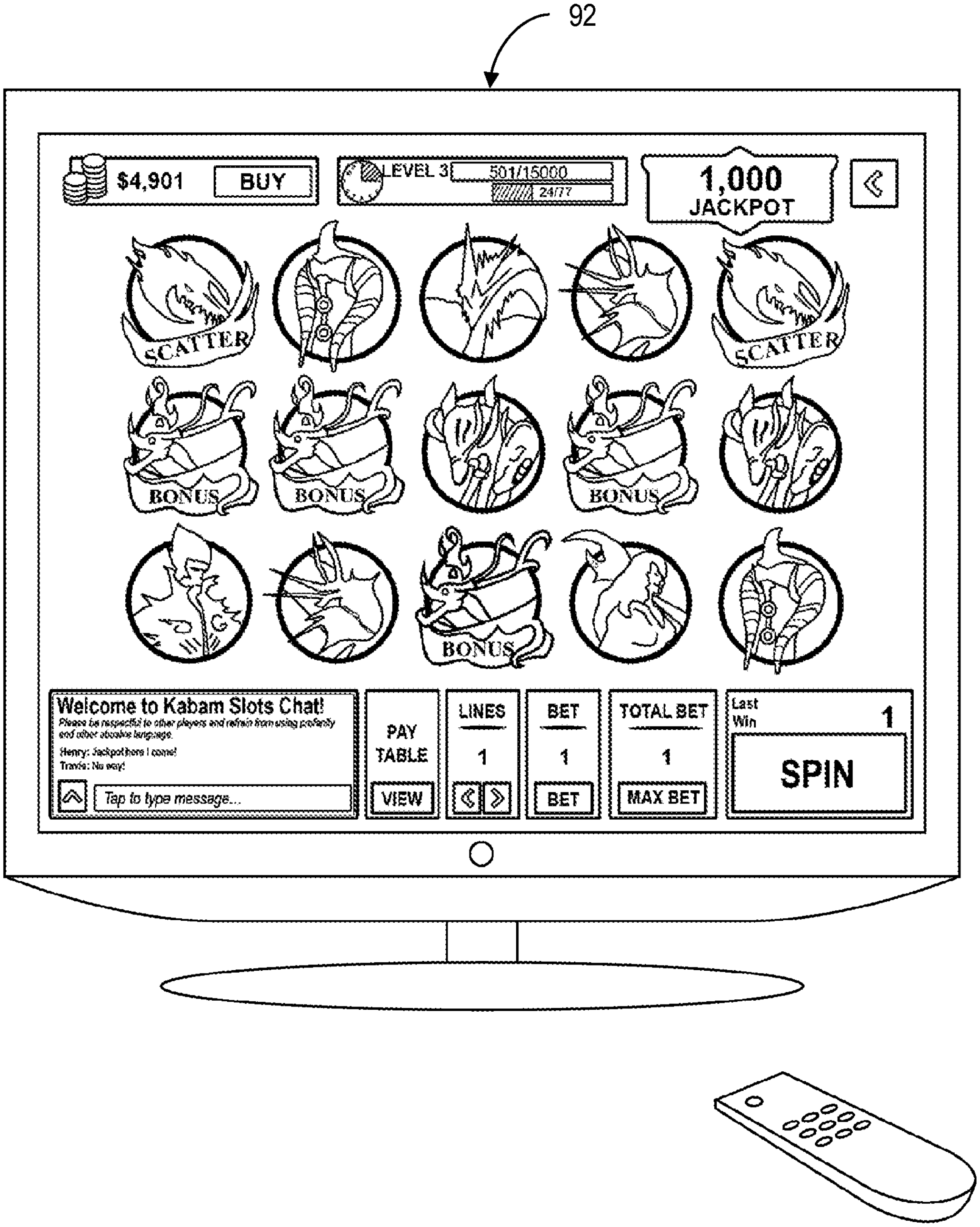
FIG. 8 illustrates an exemplary diagram of a user interface which provides durational promotions to players in an online game, according to an aspect of the invention.

FIG. 8 illustrates an exemplary diagram of a player interface 92 which provides durational promotions to players in an online game, according to an aspect of the invention.

Figure 9:
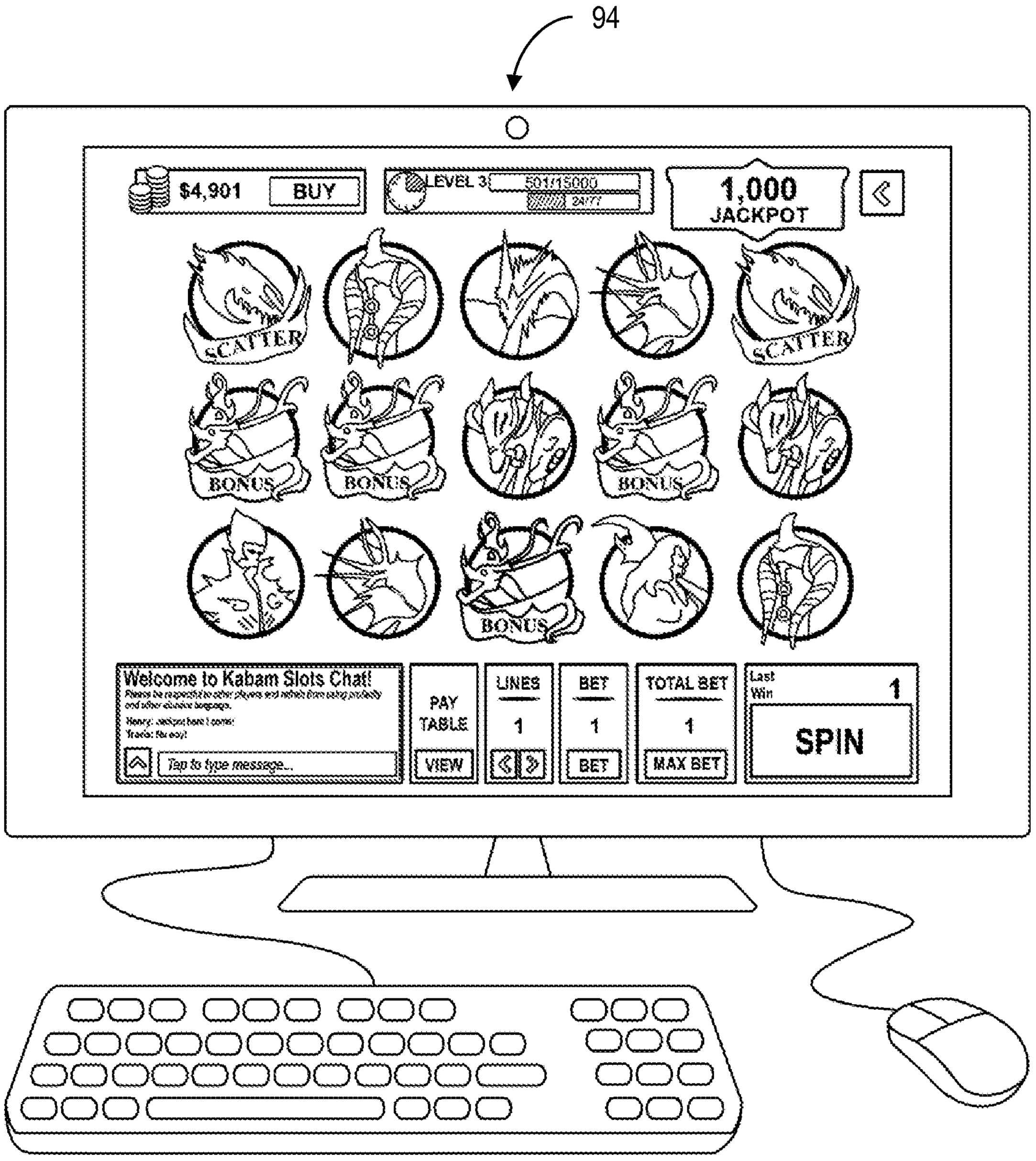
FIG. 9 illustrates an exemplary diagram of a user interface which provides durational promotions to players in an online game, according to an aspect of the invention.

FIG. 9 illustrates an exemplary diagram of a player interface 94 which provides durational promotions to players in an online game, according to an aspect of the invention.

It would be understood by one of ordinary skill in the art that the player interfaces may not be limited to the embodiment illustrated in FIGS. 3-9. The player interfaces may be associated with any objective, activity, action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing temporary adjustments of probabilities associated with outcomes of certain operations performed by players in an online game in a game space, wherein the players include a first player, the system comprising:

one or more physical computing processors configured by machine-readable instructions to:

execute an instance of the online game in the game space;

receive commands and/or instructions to perform one or more operations within the online game, wherein the commands and/or instructions are received from the players, wherein the one or more operations include a first operation of a first operation type, wherein individual outcomes of the one or more operations of the first operation type are determined based on a first outcome probability;

temporarily adjust, subsequent to a particular first purchase by the first player of one or more particular virtual items, the first outcome probability for the first player, such that the first outcome probability for the individual outcomes of the one or more operations of the first operation type by the first player are temporarily adjusted to a second outcome probability before reverting to the first outcome probability, wherein the second outcome probability is more favorable to the first player than the first outcome probability, wherein the one or more operations of the first operation type are performed within the online game in response to one or more particular commands by the first player; and revert the second outcome probability for the individual outcomes of the one or more operations of the first operation type by the first player to the first outcome probability.

2. The system of claim 1, wherein the one or more physical computing processors are configured by machine-readable instructions such that a temporary adjustment of the first outcome probability is for a predetermined period of time, wherein a remainder of the predetermined period of time is communicated to the first player through a clock running down.

3. The system of claim 1, wherein the one or more physical computing processors are configured by machine-readable instructions such that a temporary adjustment of the first outcome probability has been communicated to the first player prior to the completion of the particular first purchase.

4. The system of claim 1, wherein the one or more physical computing processors are configured by machine-readable instructions such that a temporary adjustment of the first outcome probability is for a predetermined period of time, wherein a remainder of the predetermined period of time is communicated to the first player subsequent to the particular first purchase.

5. The system of claim 1, wherein the one or more physical computing processors are configured by machine-readable instructions such that a temporary adjustment of the first outcome probability is extended by an extended period of time based on an additional purchase by the first player of one or more virtual items.

6. The system of claim 5, wherein the one or more physical computing processors are configured by machine-readable instructions such that the extended period of time is displayed to the first player.

7. The system of claim 1, wherein the one or more physical computing processors are further configured to:

facilitate the particular first purchase by the first player.

8. A computer implemented method for providing temporary adjustments of probabilities associated with outcomes of certain operations performed by players in an online game in a game space, wherein the players include a first player, the method being implemented in a computer system that includes one or more physical processors configured by machine-readable instructions, the method comprising:

executing an instance of the online game in the game space;

receiving commands and/or instructions to perform one or more operations within the online game, wherein the commands and/or instructions are received from the players, wherein the one or more operations include a first operation of a first operation type, wherein individual outcomes of the one or more operations of the first operation type are determined based on a first outcome probability;

temporarily adjusting, subsequent to a particular first purchase by the first player of one or more particular virtual items, the first outcome probability for the first player, such that the first outcome probability for the individual outcomes of the one or more operations of the first operation type by the first player are temporarily adjusted to a second outcome probability before reverting to the first outcome probability, wherein the second outcome probability is more favorable to the first player than the first outcome probability, wherein the one or more operations of the first operation type are performed within the online game in response to one or more particular commands by the first player; and reverting the second outcome probability for the individual outcomes of the one or more operations of the first operation type by the first player to the first outcome probability.

9. The method of claim 8, wherein a temporary adjustment of the first outcome probability is for a predetermined period of time, wherein a remainder of the predetermined period of time is communicated to the first player through a clock running down.

10. The method of claim 8, wherein a temporary adjustment of the first outcome probability has been communicated to the first player prior to the completion of the particular first purchase.

11. The method of claim 8, wherein a temporary adjustment of the first outcome probability is for a predetermined period of time, wherein a remainder of the predetermined period of time is communicated to the first player subsequent to the particular first purchase.

12. The method of claim 8, wherein a temporary adjustment of the one or more outcome probabilities is extended by an extended period of time based on an additional purchase by the first player of the one or more virtual items for use within the online game.

13. The method of claim 12, wherein the extended period of time is displayed to the first player.

14. The method of claim 8, further comprising:

facilitating the particular first purchase by the first player.

* * * * *